United States Patent
Nakamura et al.

(10) Patent No.: US 10,840,491 B2
(45) Date of Patent: Nov. 17, 2020

(54) PROCESS FOR PRODUCING CELLULOSE-NANOFIBER-FILLED MICROPOROUS STRETCHED POLYOLEFIN FILM, MICROPOROUS CELLULOSE-NANOFIBER COMPOSITE FILM, AND SEPARATOR FOR NON-AQUEOUS SECONDARY BATTERY

(71) Applicant: THE JAPAN STEEL WORKS, LTD., Tokyo (JP)

(72) Inventors: Satoru Nakamura, Hiroshima (JP); Yoshiyuki Kushizaki, Hiroshima (JP); Ryou Ishiguro, Hiroshima (JP); Mariko Yoshioka, Kyoto (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 14/895,856

(22) PCT Filed: Jun. 4, 2014

(86) PCT No.: PCT/JP2014/064802
§ 371 (c)(1),
(2) Date: Dec. 3, 2015

(87) PCT Pub. No.: WO2014/196551
PCT Pub. Date: Dec. 11, 2014

(65) Prior Publication Data
US 2016/0133902 A1     May 12, 2016

(30) Foreign Application Priority Data
Jun. 4, 2013     (JP) .................... 2013-117630

(51) Int. Cl.
H01M 2/16     (2006.01)
H01M 2/14     (2006.01)
(Continued)

(52) U.S. Cl.
CPC .......... H01M 2/145 (2013.01); B29D 99/005 (2013.01); C08J 5/18 (2013.01); C08L 1/08 (2013.01);
(Continued)

(58) Field of Classification Search
CPC .......................... H01M 2/162; H01M 2/1626
See application file for complete search history.

(56) References Cited

U.S. PATENT DOCUMENTS 3,804,884 A * 4/1974 Jeffrey et al. ........... C07C 67/26
560/209
6,362,330 B1 * 3/2002 Simon .................... C08B 13/00
428/508

(Continued)

FOREIGN PATENT DOCUMENTS

CN     1898310 A     1/2007
CN   102812076 A   12/2012
(Continued)

OTHER PUBLICATIONS

Communication dated Dec. 23, 2016, issued by the European Patent Office in counterpart European application No. 14808085.6.
(Continued)

*Primary Examiner* — Cynthia H Kelly
*Assistant Examiner* — Julian Anthony
(74) *Attorney, Agent, or Firm* — Sughrue Mion, PLLC

(57) ABSTRACT

A method for producing a cellulose nanofiber-containing polyolefin microporous stretched film according to the invention includes: a first step of obtaining a cellulose powder dispersion mixture by uniformly dispersing a cellulose which has a powder particle shape and whose hydroxyl groups have been subjected to a lipophilizing treatment using a dibasic acid anhydride, in a plasticizer; a second step of melt-kneading the cellulose powder disper- (Continued)

SEM Image of SA-Processed Cellulose Nanofiber Composite Separator
(Example 1)

sion mixture and a polyolefin to obtain a polyolefin resin composition; a third step of extrusion-molding the polyolefin resin composition to obtain an extrudate; a fourth step of stretching the extrudate with a film stretcher to obtain a film; a fifth step of extracting out the plasticizer from the film; and a sixth step of thermally fixing the film from which the plasticizer has been extracted out for inhibiting contraction, while stretching the film at a temperature not higher than a melting point of the polyolefin, in which a twin-screw kneading extruder is used only once throughout the second and third steps.

7 Claims, 6 Drawing Sheets

(51) Int. Cl.
C08L 1/08 (2006.01)
C08J 5/18 (2006.01)
B29D 99/00 (2010.01)
C08K 7/02 (2006.01)
H01M 10/0525 (2010.01)

(52) U.S. Cl.
CPC ......... H01M 2/162 (2013.01); C08J 2323/02 (2013.01); C08K 7/02 (2013.01); H01M 10/0525 (2013.01)

(56) References Cited

U.S. PATENT DOCUMENTS

| 2007/0148552 | A1 | 6/2007 | Ikemoto et al. |
| 2010/0297490 | A1* | 11/2010 | Takami ............... H01M 2/1633 429/131 |
| 2012/0295165 | A1* | 11/2012 | Morin .................... D21H 13/10 429/247 |
| 2013/0011716 | A1 | 1/2013 | Sano et al. |
| 2013/0303749 | A1* | 11/2013 | Vehniaeinen ............ D21D 1/20 536/56 |
| 2014/0072878 | A1* | 3/2014 | Nemoto ............. H01M 2/1626 429/249 |
| 2014/0227605 | A1 | 8/2014 | Nakamura et al. |
| 2015/0171395 | A1* | 6/2015 | Ikuma .................. B01D 67/003 429/249 |
| 2015/0214528 | A1 | 7/2015 | Sano et al. |
| 2016/0006012 | A1 | 1/2016 | Sano et al. |

FOREIGN PATENT DOCUMENTS

| EP | 1698656 A1 | 9/2006 |
| JP | 2003-123724 A | 4/2003 |
| JP | 2009-293167 A | 12/2009 |
| JP | 2009293167 | * 12/2009 |
| JP | 2012-167202 A | 9/2012 |
| JP | 2013-56958 A | 3/2013 |
| WO | 2014/017335 A1 | 1/2014 |

OTHER PUBLICATIONS

Search Report dated Aug. 26, 2014 by the International Searching Authority in related Application No. PCT/JP2014/064802.
Communication dated Mar. 15, 2016, issued by the Japanese Patent office in counterpart Japanese Patent Application No. 2013-117630.
Communication dated Jun. 30, 2017 by the State Intellectual Property Office of P.R. China in counterpart Chinese Patent Application No. 201480032245.0.

* cited by examiner (Outline View of Kneader)

View of Stretched Condition with Small-Size Stretcher

TEX30α (The Japan Steel Works, Ltd.)

Dispersion Condition of Cellulose Nanofiber
with or without SA-Processing (in liquid paraffin)

SEM Image of SA-Processed Cellulose Nanofiber Composite Separator
(Example 1)

SEM Image of
SA-Processed and PO-Added Cellulose Nanofiber Composite Separator
(Example 2)

SEM Image of Unprocessed Cellulose Nanofiber Composite Separator
(Example 3)

PROCESS FOR PRODUCING CELLULOSE-NANOFIBER-FILLED MICROPOROUS STRETCHED POLYOLEFIN FILM, MICROPOROUS CELLULOSE-NANOFIBER COMPOSITE FILM, AND SEPARATOR FOR NON-AQUEOUS SECONDARY BATTERY

TECHNICAL FIELD

The present invention relates to a method for producing a cellulose nanofiber-containing polyolefin microporous stretched film, a cellulose nanofiber microporous composite film and a separator for nonaqueous secondary batteries, and especially relates to a novel improvement for producing a cellulose nanofiber microporous composite film in which cellulose is uniformly dispersed in the form of nanofibers therein by kneading and compounding a cellulose powder-dispersed plasticizer and a polymer such as a polyolefin using a twin-screw extruder.

BACKGROUND ART

A production method for a cellulose nanofiber microporous composite film of the type that has been heretofore employed is as follows.

Heretofore, a cellulose nanofiber (CeNF) has a hydroxyl group and is hydrophilic, and therefore in the case where the nanofiber is mixed in a matrix such as a polyolefin to obtain a composite, CeNFs aggregate to form clumps due to hydrogen bonds thereof and therefore could not be uniformly dispersed in the matrix. For example, in the case where a film of a CeNF composite is produced, first an aqueous slurry containing hydrophilic cellulose nanofibers dispersed therein is injected and mixed in a polyolefin kept kneaded in an extruder, and then dewatered to produce a CeNF composite polyolefin material, and the material is formed into a film. Alternatively, a nonwoven fabric of CeNF itself serving as the main component thereof is used.

A micropores-formed polyolefin sheet is considered to be used as a separator for nonaqueous secondary batteries, and regarding the production method for the separator, in general, the above-mentioned CeNF composite polyolefin material and a plasticizer such as paraffin are kneaded according to a wet process at a temperature not lower than the melting point of the two, then extrusion-molded through a T-die and cooled, and thereafter the phase-separated plasticizer is removed with an extracting agent such as methylene chloride to produce a micropores-formed film.

Next described is a production method for a microporous sheet through dispersion and mixing of CeNF in polyolefin. First, as described above, it is known that CeNF is, as it is, difficult to form into a composite material in which CeNF is uniformly dispersed in a polyolefin. Given the situation, a technique has been promoted, in which the hydroxyl group in cellulose is partly esterified to prepare a starburst-processed cellulose-based aqueous slurry, and then this is compounded with polyolefin (Patent Document 1). In this, as a result of assiduous studies made for developing a technique that exceeds the knowledge, there has been found a technique which is more rational and simplified as compared with any already-known method; that is, a cellulose in which the hydroxyl group has been partly esterified is, as it is, mixed and swollen with a plasticizer such as liquid paraffin to obtain a slurry, and then without performing any specific nanofibers-forming treatment such as starburst treatment, the shiny is melt-kneaded in a twin-screw extruder or a pressure kneader to thereby compound the cellulose and the polyolefin for good dispersion while the cellulose is formed into nanofibers. This is an essential technology that realizes production of a cellulose nanofiber-reinforced microporous composite sheet (film), which is an object of the present invention. After kneaded with a twin-screw extruder or a pressure kneader, the slurry is extruded though a T-die and cooled and formed on a cast roll to produce a raw film in which the paraffin and the polyolefin are phase-separated. Next, in order to be used as a separator for nonaqueous secondary batteries, this must be further processed to be a microporous film. For this, the raw film is subjected to horizontal/vertical biaxial stretching or simultaneous biaxial stretching, and thereafter the plasticizer is extracted out with an extracting agent such as methylene chloride and then the resultant film is heat-set to obtain a microporous film.

A basic function of an ordinary separator for nonaqueous secondary batteries is described. A separator for lithium ion batteries is positioned between positive and negative electrodes, and exists while keeping an electrolyte in the open micropores thereof. In charging, the lithium ions in the positive electrode ionize in the electrolyte while leaving electrons, then pass through the micropores in the separator and reach the negative electrode, and are stored between carbon lattices. At this time, electrons pass through the circuit and are transferred to the negative electrode, and the separator must be an insulator so as to prevent short-circuiting between the positive and negative electrodes. In addition, the separator for use in lithium ion batteries is required to be such that it does not interfere with ionic conduction between the two electrodes, that it can store an electrolyte, and that it is resistant to an electrolyte. For preventing the separator from being broken due to the pressure given thereto in electrode winding, or due to the pressure also given thereto through expansion and contraction of electrodes in charging/discharging, or due to the impact given thereto in falling of batteries, the separator is further required to have a high puncture strength. The high puncture strength is important for the reason that, when lithium ion batteries are degraded with time, lithium precipitates on the carbon negative electrode and crystallizes like needles thereon, thereby puncturing the separator to be in contact with the positive electrode to cause short-circuiting, and further causes a runaway risk due to abnormal heat generation.

It has already been confirmed in Patent Document 2 that compounding cellulose nanofibers with a polyolefin material is effective. A specific production process therefor includes once compounding cellulose nanofibers dispersed in water with a polyolefin in a twin-screw kneader, and then pelletizing the resulting mixture. This is again mixed with paraffin in another twin-screw kneader.

BACKGROUND ART DOCUMENT

Patent Document

Patent Document 1: JP-A 2009-293167
Patent Document 2: JP-A 2013-56958

SUMMARY OF THE INVENTION

Problems That The Invention Is To Solve

Specifically, the method of Patent Document 2 requires production of the CeNF composite polyolefin pellet raw material prior to the step of producing the composite material according to a conventional wet process, and is problematic in that the method for producing the material is redundant and causes cost increase. In addition, in the produced material, cellulose may remain in the aqueous suspension therefore resulting in content reduction, and since the pellets once produced are again kneaded, there may occur reaggregation of the cellulose in polyolefin during kneading. Consequently, the dispersion condition would be worsened and, as the case may be, the puncture strength and the thermal contractility that the film should naturally have, could not be satisfied.

The present invention is made to solve the problems with the conventional technique, and an object thereof is to provide a CeNF composite polyolefin separator having high quality, which is improved especially in point of the puncture strength and the short-circuit temperature among the mechanical and thermal properties required for separators for lithium ion batteries, at a lower cost as compared to the conventional methods.

Additionally, in the present invention, a cellulose powder dispersion mixture is obtained by uniformly dispersing a cellulose which has a powder particle shape and whose hydroxyl groups have been subjected to a lipophilizing treatment using a dibasic acid anhydride, in a plasticizer, and this mixture is kneaded and fibrillated with a polyolefin, and compounded in a high-dispersion state. Therefore, the present invention enables to produce a cellulose nanofiber-containing polyolefin microporous stretched film such as a microporous sheet for nonaqueous secondary batteries, using a twin-screw extruder only once in the process without changing the apparatus configuration and the ordinary wet process.

Means For Solving The Problems

A method for producing a cellulose nanofiber-containing polyolefin microporous stretched film according to the present invention, includes: a first step of obtaining a cellulose powder dispersion mixture by uniformly dispersing a cellulose which has a powder particle shape and whose hydroxyl groups have been subjected to a lipophilizing treatment using a dibasic acid anhydride, in a plasticizer; a second step of melt-kneading the cellulose powder dispersion mixture and a polyolefin to obtain a polyolefin resin composition; a third step of extrusion-molding the polyolefin resin composition to obtain an extrudate; a fourth step of stretching the extrudate with a film stretcher to obtain a film; a fifth step of extracting out the plasticizer from the film; and a sixth step of thermally fixing the film from which the plasticizer has been extracted out for inhibiting contraction, while stretching the film at a temperature not higher than a melting point of the polyolefin, in which a twin-screw kneading extruder is used only once throughout the second and third steps; in which the lipophilizing treatment includes performing a monoesterification treatment or performing a secondary propylene oxide addition treatment; in which one kind or a mixture of several kinds among: liquid paraffin, nonan, decane, decalin, paraxylene, undecane and dodecane which are linear or cyclic aliphatic hydrocarbons; mineral oil fractions whose boiling point corresponds to that of these compounds; and dibutyl phthalate and dioctyl phthalate which are phthalates having a liquid form at room temperature, is used as the plasticizer; and/or in which the cellulose powder is contained in an amount of from 0.01 to 30% by weight in the cellulose powder dispersion mixture. Additionally, a cellulose nanofiber microporous composite film according to the present invention includes the cellulose nanofiber-containing polyolefin microporous stretched film produced by the production method according to any of the above-described methods. Also, a cellulose nanofiber microporous composite film according to the present invention has a configuration in which the cellulose powder in the polyolefin microporous stretched film produced by the production method according to any of the above-described methods is contained in an amount of from 0.01 to 30% by weight based on a total weight of the polyolefin microporous stretched film. Furthermore, a separator for nonaqueous secondary batteries according to the present invention, includes the cellulose nanofiber-containing polyolefin microporous stretched film produced by the production method according to any of the above-described methods.

Advantage of the Invention

The process for producing a cellulose nanofiber-containing polyolefin microporous stretch film and the cellulose nanofiber microporous composite film of the present invention are constituted as above, and can realize the following effects.

Specifically, the production method includes: a first step of obtaining a cellulose powder dispersion mixture by uniformly dispersing a cellulose which has a powder particle shape and whose hydroxyl groups have been subjected to a lipophilizing treatment using a dibasic acid anhydride, in a plasticizer; a second step of melt-kneading the cellulose powder dispersion mixture and a polyolefin to obtain a polyolefin resin composition; a third step of extrusion-molding the polyolefin resin composition to obtain an extrudate; a fourth step of stretching the extrudate with a film stretcher as shown in FIG. 2 to obtain a film; a fifth step of extracting out the plasticizer from the film; and a sixth step of thermally fixing the film from which the plasticizer has been extracted out for inhibiting contraction, while stretching the film at a temperature not higher than a melting point of the polyolefin, in which a twin-screw kneading extruder as shown in FIG. 3 is used only once throughout the second and third steps. Namely, the cellulose powder that has been subjected to a modification treatment such as a lipophilizing treatment is dispersed in paraffin which is a plasticizer, and the resultant dispersion mixture is added to a polyolefin according to the same method as conventional wet process to thereby compatibilize the polyolefin and the plasticizer while, at the same time, CeNF is dispersed and compounded in the polyolefin. Therefore, since it is sufficient to use a twin-screw kneader only once as compared to the conventional separator, the cellulose yield in the composite separator can be easily controlled and, in addition, uniform dispersion thereof in the polyolefin can be realized. Accordingly, the method enables cost reduction. In addition, the mechanical strength and the thermal properties of the resultant material are improved, and products having improved safety can be thereby obtained.

In addition, according to the production method for a cellulose nanofiber-containing polyolefin microporous stretched film, in which one prepared by monoesterifying the hydroxyl groups in a cellulose having a predetermined powder particle shape with a dibasic acid anhydride is uniformly dispersed in the cellulose powder dispersion plasticizer of the polyolefin including liquid paraffin, the effect of compounding the components without changing the conventional apparatus configuration can be obtained.

Further, according to the production method for a cellulose nanofiber-containing polyolefin microporous stretched film, in which the monoesterification treatment as the lipophilizing treatment is performed, followed by performing the secondary propylene oxide addition treatment, propylene oxide having a large molecule is added and a steric hindrance effect and a high degree of lipophilicity are imparted, whereby further effects of high dispersion and aggregation inhibition can be obtained.

In addition, according to the production method for a cellulose nanofiber-containing polyolefin microporous stretched film, in which one kind or a mixture of several kinds among: liquid paraffin, nonane, decane, decalin, paraxylene, undecane and dodecane which are linear or cyclic aliphatic hydrocarbons; mineral oil fractions whose boiling point corresponds to that of these compounds; and dibutyl phthalate and dioctyl phthalate which are phthalates having a liquid form at room temperature, is used as the plasticizer, the effect of being able to select a suitable combination of the plasticizer with the raw material polyolefin can be obtained.

In addition, according to the production method for a cellulose nanofiber-containing polyolefin microporous stretched film, in which the cellulose powder is contained in an amount of from 0.01 to 30% by weight in the cellulose powder dispersion mixture, the effect of imparting necessary characteristics to the film can be obtained.

In addition, according to the cellulose nanofiber polyolefin microporous composite film including the cellulose nanofiber-containing polyolefin microporous stretched film produced by any of the above-described production methods, the effect for improving the heat resistance and the strength of the sheet can be obtained.

In addition, according to the cellulose nanofiber microporous composite film, in which the cellulose powder in the polyolefin microporous stretched film produced by any of the above-described production methods is contained in an amount from 0.01 to 30% by weight based on the total weight of the polyolefin microporous stretched film, the effect of imparting optimal characteristics to the film in accordance with the intended purpose can be obtained.

In addition, according to the separator for nonaqueous secondary batteries including the cellulose nanofiber-containing polyolefin microporous stretched film produced by any of the above-mentioned production methods, the effect of improving the safety of the separator can be obtained.

MODE FOR CARRYING OUT THE INVENTION

Figure 1:
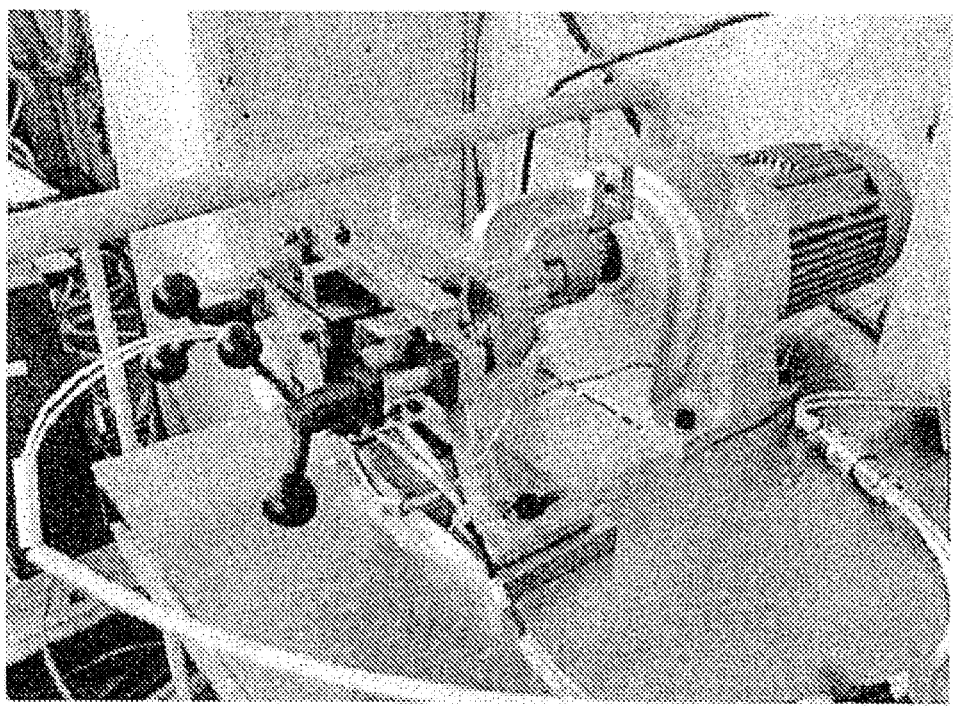
FIG. 1 is an outline view of a small-size kneader for use in the present invention.

The present invention provides a method for producing a cellulose nanofiber-containing polyolefin microporous stretched film containing cellulose uniformly dispersed in the form of nanofibers therein, in which a cellulose powder dispersion mixture is obtained by uniformly dispersing a cellulose which has a powder particle shape and whose hydroxyl groups have been subjected to a lipophilizing treatment using a dibasic acid anhydride, in a plasticizer, and this mixture is kneaded and compounded with a polymer such as a polyolefin, using a twin-screw extruder only once; and provides a cellulose nanofiber microporous composite film and a separator for nonaqueous secondary batteries.

EXAMPLES

Preferred embodiments of the method for producing a cellulose nanofiber-containing polyolefin microporous stretched film, the cellulose nanofiber microporous composite film and the separator for nonaqueous secondary batteries of the present invention are described below with reference to the drawings.

For producing a CeNF composite separator according to the present invention, CeNF is highly uniformly dispersed in a plasticizer such as paraffin used in an ordinary wet process, whereby the conventional apparatus configuration is not changed but a twin-screw kneading extruder is used only once. Consequently, the present invention has made it possible to provide a separator for nonaqueous secondary batteries, including a cellulose nanofiber microporous composite film having high strength and high heat resistance.

The raw material cellulose for use herein is, as it is, hydrophilic and is difficult to disperse in paraffin. In the present invention, one prepared through esterification or etherification of the hydroxyl groups in a cellulose nanofiber molecular structure, or one prepared through secondary addition treatment with propylene oxide or the like after the esterification treatment is dispersed in a plasticizer such as paraffin to prepare a suspension. The use of this suspension has made it possible to produce a microporous sheet using a conventional apparatus configuration and according to a wet process that is the same as an conventional process.

The polyolefin in the present invention is a polyolefin resin that is used in ordinary extrusion, injection, inflation, blow-molding or the like, for which usable is a homopolymer, a copolymer, a multistage polymer or the like of ethylene, propylene, 1-butene, 4-methyl-1-pentene, 1-hexene, 1-octene, etc. A polyolefin selected from a group of these homopolymer, copolymer, multistage polymer and others may be used singly or as combined. Representative examples of the polymers include low-density polyethylene, linear low-density polyethylene, middle-density polyethylene, high-density polyethylene, ultra-high-molecular-weight polyethylene, isotactic polypropylene, atactic polypropylene, ethylene-propylene random copolymer, polybutene, and ethylene-propylene rubber. In the case where the microporous film of the present invention is used as a separator for batteries, especially preferred is a resin containing a high-density polyethylene as the main component, in view of a high melting point and the necessary performance of high strength; and in view of the shutdown performance or the like, preferred is one that contains a polyethylene resin in an amount of 50% by weight or more of the resin component therein. On the other hand, when the proportion of an ultra-high-molecular weight polyolefin having a molecular weight of more than 1,000,000 accounts for more than 10 parts by weight of the polyolefin, it would be difficult to uniformly knead the mixture, and therefore, the proportion thereof is preferably 10 parts by weight or less.

CeNF for use in the present invention has, when dispersed in a polyolefin, a nano-order fiber diameter and a part of the hydroxyl groups existing on the fiber surface are monoesterified with a polybasic acid. Accordingly, the fiber can prevent self-aggregation and keeps high uniform dispersibility with the polyolefin, in addition, kneading and sheet formation using the fiber is easy, and a separator having mechanical and thermal properties more excellent than those of conventional separators can be obtained. In addition, after monoesterified, CeNF can be subjected to a secondary treatment such as propylene oxide addition (PO addition) for further improving the dispersibility thereof.

As the plasticizer for use in the present invention, in addition to liquid paraffin and the like, linear or cyclic aliphatic hydrocarbons such as nonan, decane, decalin, paraxylene, undecane and dodecane; mineral oil fractions whose boiling point corresponds to that of these compounds; and phthalates having a liquid form at room temperature such as dibutyl phthalate and dioctyl phthalate, etc., may be mentioned.

Further, the CeNF composite porous film of the present invention may be a single layer or a multilayer film. In the case of a multilayer film, at least one layer constituting the film may contain CeNF. The final thickness of the film preferably falls within a range of from 5 μm to 50 μm. When the film thickness is 5 μm or more, the mechanical strength could be sufficient, and when the film thickness is 50 μm or less, the occupied volume of the separator may reduce and would be therefore advantageous in point of battery capacity increment. The Gurley value of the porous film of the present invention is preferably within a range of from 50 sec/100 cc to 1,000 sec/100 cc. When the Gurley value thereof is 50 sec/100 cc or more in use as a separator for batteries, self-discharge would be low, and when the Gurley value thereof is 1,000 sec/100 cc or less, excellent charge/discharge characteristics can be obtained.

Examples of the present invention are described below. However, the present invention is not whatsoever restricted by these Examples, etc. The properties of the microporous film of the present invention were evaluated according to the test methods mentioned below.

Film Thickness and Porosity:

The sample was cut out into pieces of 50×50 mm square, and the thickness thereof was measured with a microgauge at 25 points in every sheet. The found data were averaged to obtain the film thickness. The porosity was calculated from the theoretical weight of the sheet that had been calculated from the measured weight, the density and the volume thereof.

Gurley Value:

The Gurley value was measured using a Gurley automatic measuring instrument (manufactured by TESTING MACHINES, INC.).

In this measurement, the time taken until 100 cc of air passed through the sheet was counted, as stipulated in JISP8177, and was referred to as the Gurley value.

Puncture Strength:

The puncture strength was measured using an automatic puncture strength measuring instrument (KES-FB3-AUTO, manufactured by Kato Tech Co., Ltd.). The formed sheet was cut into pieces of 50×50 mm square, and the puncture strength in each position at intervals of 5 mm was measured. The found data were averaged in every sheet to obtain an average value.

FE-SEM Observation:

Using an ion-sputtering apparatus (ESC-101 manufactured by Elionix Inc.), the formed sheet was processed for platinum deposition thereon in a thickness of about 3 nm, and then the surface thereof was microscopically observed using FE-SEM (SUPRA55VP, manufactured by Carl Zeiss AG).

Example 1

As a cellulose powder sample, used was Ceolus FE-101 (manufactured by Asahi Kasei Chemicals Corporation), and in a ratio by weight of cellulose/succinic anhydride (SA) =100/11.81, these were kneaded with a pressure kneader at 125° C. for 20 minutes for monoesterification, and then, the unreacted matters were removed through acetone extraction (known SA processing). Subsequently, the SA-processed cellulose micropowder was mixed in paraffin, and swollen and stirred therein for 24 hours. The composition of the raw material is shown in Example 1 in Table 1. Using a kneader of FIG. 1, 30 parts by weight of Mitsui Hizex (030S) was mixed and kneaded in 70 parts by weight of the above-mentioned paraffin, and then stretched in a mode of simultaneous biaxial stretching, using a tenter of FIG. 2. The kneading condition and the stretching condition are shown in Table 2 and Table 3. After the biaxial stretching with the tenter, the liquid paraffin was defatted with methylene chloride, and then the film was heat-set at 118° C. for 10 minutes.

TABLE 1

Summary of Cellulose Composite Polyolefin Raw Material

| | Raw Material Constitution | Kneading Machine | (1) Name of UMwPE (manufacturer) | (2) Name of CeNF (manufacturer) | (3) Name of Paraffin (manufacturer) | PE/Paraffin blend ratio | CeNF weight ratio | Fibrillation Treatment |
|---|---|---|---|---|---|---|---|---|
| Example 1 | (1) UHMwPE powder (2) Es-Ce (SA processed) (3) Liquid paraffin | kneader | 030s (Mitsui Chemical) | Ceolus FD-101 (Asahi Kasei Chemicals Corporation) | 350P (Moresco) | 30/70 | 0.5 wt % | Absent |
| Example 2 | (1) UHMwPE powder (2) Es-PO-Ce (SA processed + PO addition) (3) Liquid paraffin | kneader | 030s (Mitsui Chemical) | Ceolus FD-101 (Asahi Kasei Chemicals Corporation) | 350P (Moresco) | 30/70 | 0.5 wt % | Absent |
| Example 3 | (1) UHMwPE powder (2) Ce (unprocessed) (3) Liquid paraffin | kneader | 030s (Mitsui Chemical) | Ceolus FD-101 (Asahi Kasei Chemicals Corporation) | 350P (Moresco) | 30/70 | 0.5 wt % | Absent |
| Comparative Example 1 | (1) UHMwPE powder (3) Liquid paraffin | kneader | 030s (Mitsui | — | 350P (Moresco) | 30/70 | 0.5 wt % | Absent |

TABLE 1-continued

Summary of Cellulose Composite Polyolefin Raw Material

|  | Raw Material Constitution | Kneading Machine | (1) Name of UMwPE (manufacturer) | (2) Name of CeNF (manufacturer) | (3) Name of Paraffin (manufacturer) | PE/Paraffin blend ratio | CeNF weight ratio | Fibrillation Treatment |
|---|---|---|---|---|---|---|---|---|
| Comparative Example 2 | (1) (UHMwPE + CeNF (SA processed)) blend pellets (2) Liquid paraffin | kneader | 030s (Mitsui Chemical) | Ceolus FD-101 (Asahi Kasei Chemicals Corporation) | 350P (Moresco) | 30/70 | 0.5 wt % | Present |
| Comparative Example 3 | (1) (UHMwPE + CeNF (SA processed)) blend pellets (2) Liquid paraffin | TEX30α | 030s (Mitsui Chemical) | Ceolus FD-101 (Asahi Kasei Chemicals Corporation) | 350P (Moresco) | 30/70 | 0.5 wt % | Present |

UHMwPE: Ultra-high-molecular-weight polyethylene
Es-Ce: Monoesterified cellulose
Es-PO-Ce: Monoesterified, PO-added cellulose
Ce: Cellulose powder
CeNF: Cellulose nanofiber
SA processing: succinic anhydride monoesterification
PO addition: Propylene oxide addition treatment
Fibrillation: Starburst treatment

TABLE 2

Kneading Condition

| Parameter | Temperature (° C.) | Rotation Number (rpm) | Kneading Time min | Extrusion Rate Kg/h |
|---|---|---|---|---|
| Kneader | 180 | 40 | 30 | — |
| TEX30α | 180 | 300 | — | 10 |

TABLE 3

Stretching Condition

| MD Stretching Condition | | | TD Stretching Condition | | |
|---|---|---|---|---|---|
| Stretching Temperature (° C.) | Draw Ratio times | Stretching Speed (mm/min) | Stretching Temperature (° C.) | Draw Ratio times | Stretching Speed (mm/min) |
| 110 | 5 to 6 | 3,000 to 6,000 | 110 | 5 to 7 | 3,000 to 6,000 |

Example 2

In the method of Example 1, used was a cellulose nanofiber to which propylene oxide was added as the secondary treatment after the SA-processing. The raw material composition is shown in Example 2 in Table 1. The other conditions were the same as in Example 1.

Example 3

In the method of Example 1, as a raw material, known cellulose without being subjected to the SA processing was used. The raw material composition is shown in Example 3 in Table 1. The other conditions were the same as in Example 1.

Comparative Example 1

In the method of Example 1, a raw material not using a cellulose nanofiber was used to form a sheet. The raw material composition is shown in Comparative Example 1 in Table 1 described below. The other conditions were the same as in Example 1.

Comparative Example 2

In the method of Example 1, an aqueous slurry prepared by subjecting a raw material cellulose to the SA processing followed by processing for starburst treatment was kneaded with 030S and dewatered, and the resultant cellulose nanofiber composite polyethylene pellets were used to produce a sheet. The raw material composition is shown in Comparative Example 2 in Table 1. The other conditions were the same as in Example 1.

Comparative Example 3

Figure 3:
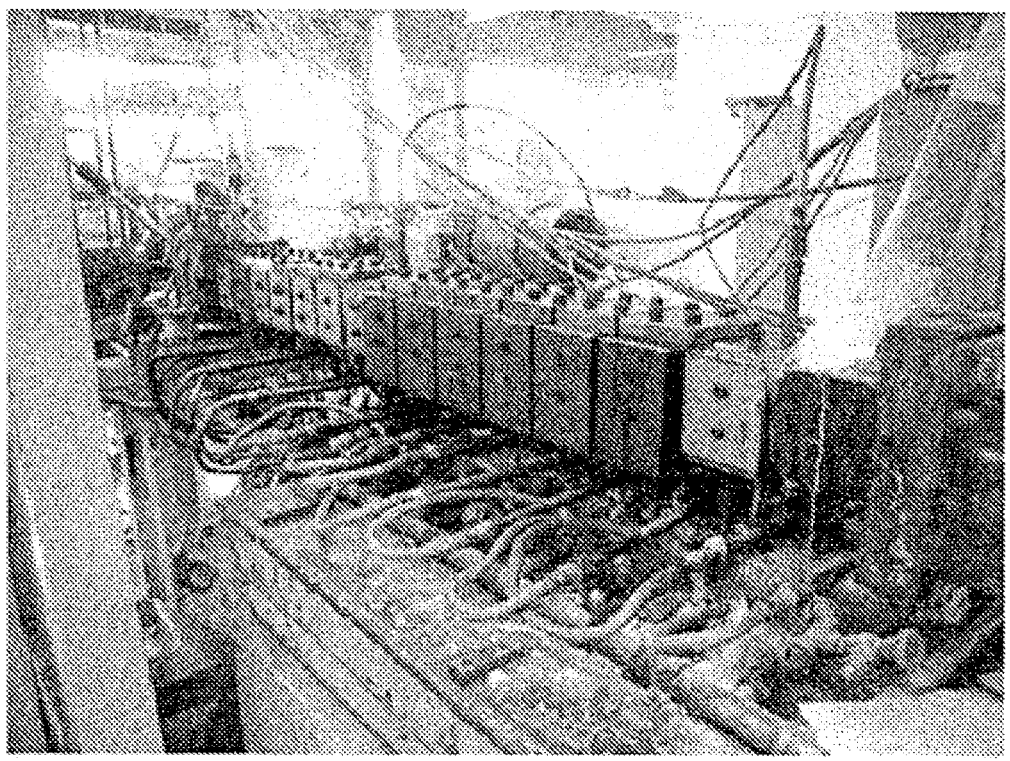
FIG. 3 is an outward appearance of a continuous kneader TEX30α that is a twin-screw kneading extruder.

An aqueous slurry prepared by subjecting a raw material cellulose to the SA processing followed by processing for starburst treatment was kneaded with 030S and dewatered, and the resultant cellulose nanofiber composite polyethylene pellets were used and continuously kneaded in TEX30α of FIG. 3 to produce a raw sheet. The raw material composition is shown in Comparative Example 3 in Table 1. The subsequent simultaneous biaxial stretching, defatting and heat-setting were the same as in Example 1.

Comparison of Results

Figure 4:
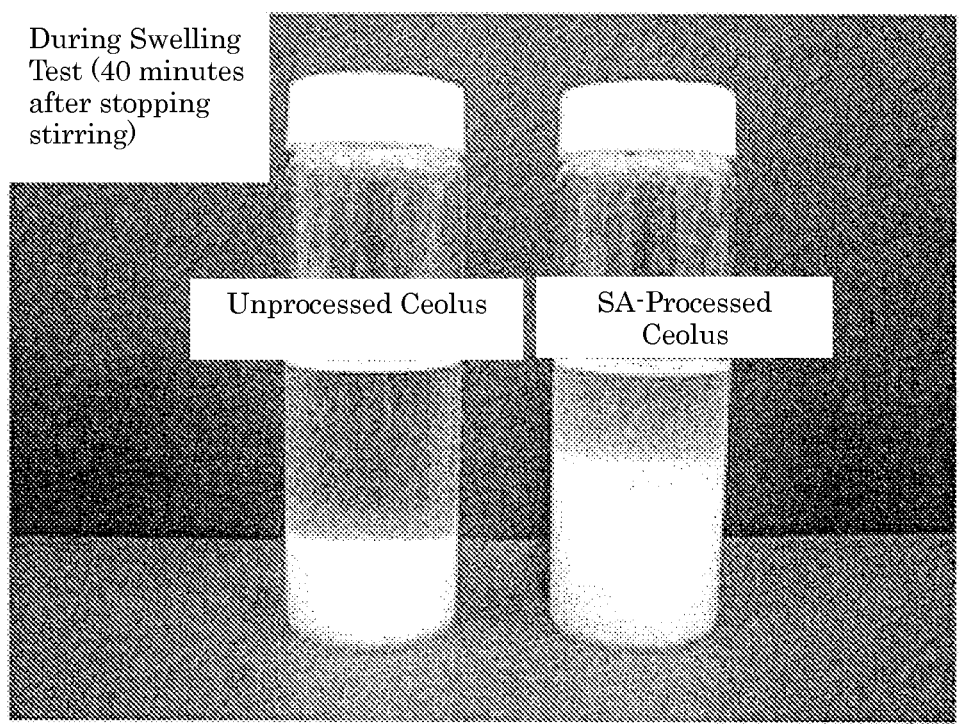
FIG. 4 is a photograph showing dispersion of a chemically-modified cellulose powder in paraffin in the presence or absence of lipophilizing treatment.

Before and after SA processing, the dispersion condition in paraffin in 40 minutes after 18-hours swelling and stirring treatment is shown in FIG. 4. As compared with the unprocessed cellulose, the known SA-processed cellulose exhibited dramatically-improved dispersibility in paraffin.

Figure 5:
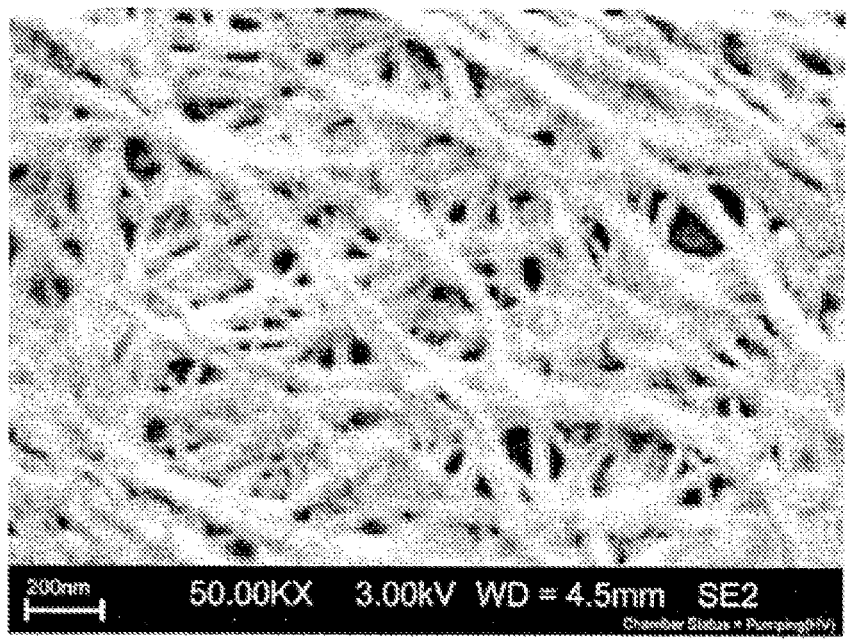
FIG. 5 is a photograph showing a SEM image of the microporous film produced in Example 1.
Figure 6:
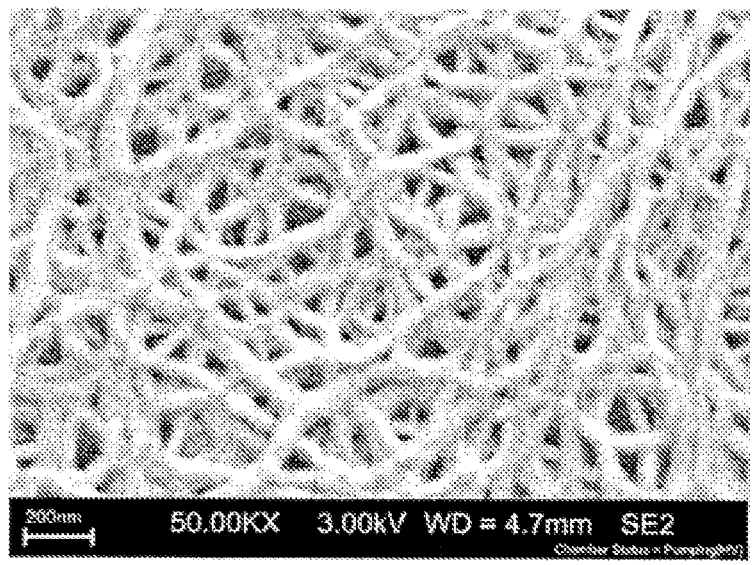
FIG. 6 is a photograph showing a SEM image of the microporous film produced in Example 2.
Figure 7:
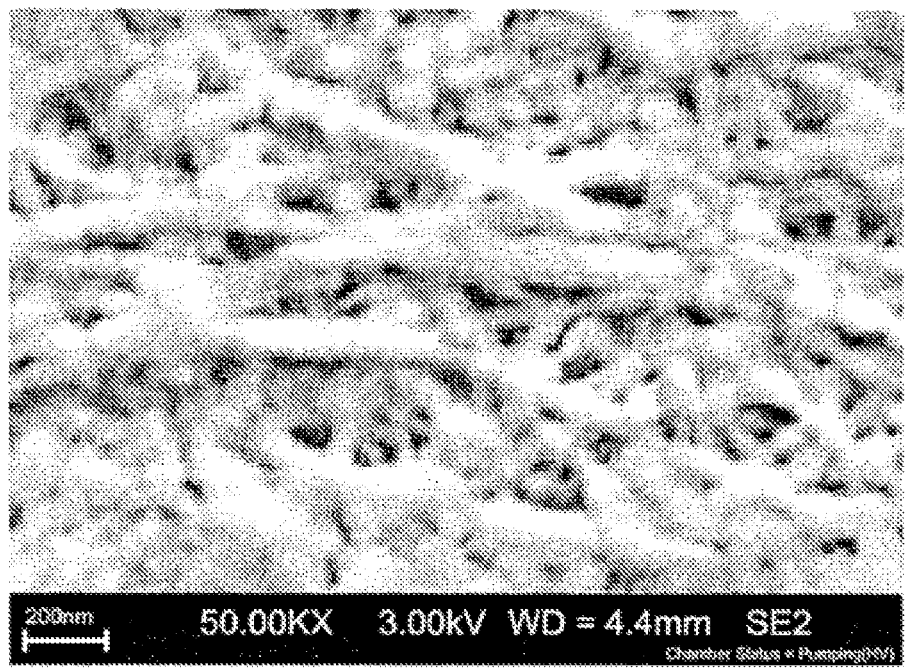
FIG. 7 is a photograph showing a SEM image of the microporous film produced in Example 3.

FIG. 5, FIG. 6 and FIG. 7 show SEM images of the microporous films produced under the conditions of Examples 1 to 3. FIG. 7 show a sample in which the unprocessed cellulose powder was, directly as it was, mixed with liquid paraffin and ultra-high-molecular-weight polyethylene powder, and the resultant raw material was kneaded with a kneader and formed into a film. From this, many clumps to be knots are seen in the polyethylene crystal fibers. It is considered that cellulose would have aggregated in those parts, and it is presumed that the dispersion condition in polyethylene would not be good. FIG. 5 shows a sample using a cellulose powder that had been previously SA-processed, and in this, the clumps reduced as compared with those in FIG. 7, and it is presumed that the dispersion condition in this would have been improved. Further, FIG. 6 shows a result of the sample that had been previously SA-processed and then processed for secondary PO-addition treatment. As compared with FIG. 5, few clumps are seen, and it is considered that the cellulose nanofiber would have well and uniformly dispersed in the ultra-high-molecular-weight HDPE.

Table 4 shows main separator characteristics in Examples 1 to 3 and Comparative Examples 1 to 3. Comparing the results in Examples 1 to 3, the Gurley value that affects on the battery characteristics of lithium ion batteries is in an order of Example 2 <Example 1 <Example 3. The low Gurley value means easy passing of lithium ions through the sample. This indicates that, as compared with the others, the sample of Example 2 realized good CeNF dispersion with no aggregation, and good micropores were formed. The porosity was large in Example 1, in which, however, the micropore distribution is uneven, and this would be because, as compared with those in Example 2, pores having a large diameter would have been formed unevenly.

The puncture strength is important for preventing film breaking due to impurities in winding operation for production of batteries, and for preventing short-circuiting at the film broken by the lithium ion dendrites formed due to degradation with time. As compared with that in Example 3, the puncture strength in Examples 1 and 2 greatly increased, which would result from the CeNF addition effect.

Thermal shrinkability contributes toward safety of batteries. In particular, small TD shrinkage is effective for preventing short-circuiting between positive and negative electrodes due to sheet shrinkage by abnormal heat generation during runaway of batteries. Examples 1 to 3 are compared in shrinkage in TD, and it is seen that Examples 1 and 2 exhibit an improved effect as compared with Example 3. In particular, Example 2 has a small value, which would result from the CeNF addition effect.

TABLE 4

Typical Characteristic Values of Separator

| | Porosity (%) | Gurley Value (s/100 cc) | Puncture Strength (kgf) | 120° C. Thermal Shrinkage (%) | | Kneading Machine |
|---|---|---|---|---|---|---|
| | | | | MD | TD | — |
| Example 1 | 47.2 | 469.4 | 955 | 11.6 | 11.2 | kneader |
| Example 2 | 45.4 | 430.1 | 858 | 11.8 | 10.4 | kneader |
| Example 3 | 26.6 | 727.1 | 684 | 14.4 | 14.3 | kneader |
| Comparative Example 1 | 37.3 | 504.6 | 590 | 16.6 | 16.8 | kneader |
| Comparative Example 2 | 20.2 | 1518.6 | 899 | 15.4 | 12.3 | kneader |
| Comparative Example 3 | 44.6 | 321.8 | 1061 | 4.5 | 4.5 | TEX30α |

MD: machine direction,
TD: transverse direction

Examples 1 to 3 are compared with conventional separators not compounded with CeNF. Except those of Example 3, all the characteristic values of Gurley value, puncture strength and 120° C. thermal shrinkage were improved ones. However, the characteristics of porosity and Gurley value of Example 3 were worse than those of the samples not compounded with CeNF. This would be because the dispersion condition of CeNF was bad and therefore micropores could not be formed uniformly, which would have some negative influences on the porosity and the Gurley value.

Comparative Example 2 is a result of film formation from polyethylene pellets previously compounded with CeNF, according to the same method. However, when the film formation was carried out with a kneader under the same condition, all the characteristic values were bad. On the other hand, as shown by Comparative Example 3, the characteristics of the film produced through continuous kneading of paraffin with TEX30α were all good. This would be because, in a wet process of separator production, in general, the results greatly vary depending on the kneading condition, and in particular, swelling that has some influence on compatibility with paraffin would be insufficient in the form of pellets, and therefore micropores could not be well formed in the film. In other words like the results of Comparative Examples 2 and 3, the results of Examples 1 and 2 indicate that the continuous kneading could further optimize sheet formation, and suggest that, merely by using a dispersion prepared by dispersing SA-processed CeNF in paraffin, it becomes possible to provide a separator whose characteristics can be improved to the level to which any one produced according to conventional methods could not achieve.

Next, the gist of above-mentioned Examples 1 to 3 of the present invention is summarized as follows.

Figure 2:
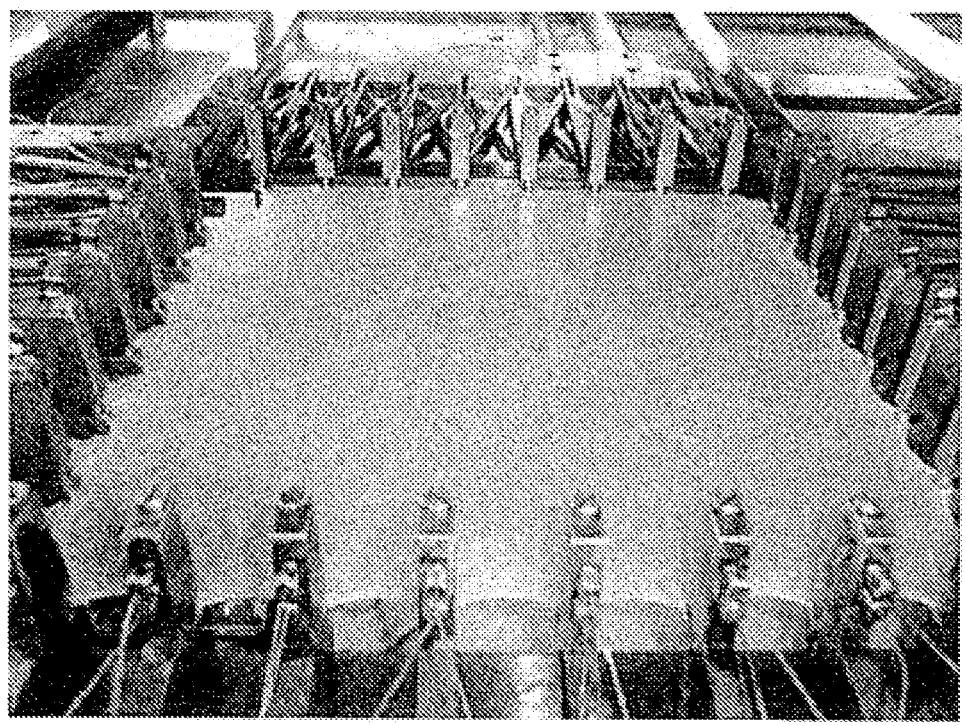
FIG. 2 is an explanatory view showing a stretched condition of a raw sheet produced by pressing with a mold after kneading with a kneader and stretched with a film stretcher.

Specifically, a method for producing a cellulose nanofiber-containing polyolefin microporous stretched film according to the present invention is a method including: a first step of obtaining a cellulose powder dispersion mixture by uniformly dispersing a cellulose which has a powder particle shape and whose hydroxyl groups have been subjected to a lipophilizing treatment using a dibasic acid anhydride, in a plasticizer; a second step of melt-kneading the cellulose powder dispersion mixture and a polyolefin to obtain a polyolefin resin composition; a third step of extrusion-molding the polyolefin resin composition to obtain an extrudate; a fourth step of stretching the extrudate with a film stretcher as shown in FIG. 2 to obtain a film; a fifth step of extracting out the plasticizer from the film; and a sixth step of thermally fixing the film from which the plasticizer has been extracted out for inhibiting contraction, while stretching the film at a temperature not higher than a melting point of the polyolefin, in which a twin-screw kneading extruder as shown in FIG. 3 is used only once throughout the second and third steps; in which the lipophilizing treatment includes performing a monoesterification treatment followed by performing a secondary propylene oxide addition treatment; in which one kind or a mixture of several kinds among: liquid paraffin, nonane, decane, decalin, paraxylene, undecane and dodecane which are linear or cyclic aliphatic hydrocarbons; mineral oil fractions whose boiling point corresponds to that of these compounds; and dibutyl phthalate and dioctyl phthalate which are phthalates having a liquid form at room temperature, is used as the plasticizer; and/or in which the cellulose powder is contained in an amount of from 0.01 to 30% by weight in the cellulose powder dispersion mixture. Additionally, a cellulose nanofiber microporous composite film according to the present invention is a cellulose nanofiber microporous composite film including the cellulose nanofiber-containing polyolefin microporous stretched film produced by the production method according to any of the above-described methods. Also, a cellulose nanofiber microporous composite film according to the present invention is a cellulose nanofiber microporous composite film in which the cellulose powder in the polyolefin microporous stretched film produced by the production method according to any of the above-described methods is contained in an amount of from 0.01 to 30% by weight based on a total weight of the polyolefin microporous stretched film. Furthermore, a separator for nonaqueous secondary batteries according to the present invention is a separator for nonaqueous secondary batteries, including the cellulose nanofiber-containing polyolefin microporous stretched film produced by the production method according to any of the above-described methods.

While the present invention has been described in detail and with reference to specific embodiments thereof, it will be apparent to one skilled in the art that various changes and modifications can be made therein without departing from the spirit and scope thereof.

The present application is based on a Japanese patent application No. 2013-117630 filed on Jun. 4, 2013, and the contents thereof are herein incorporated by reference.

INDUSTRIAL APPLICABILITY

The method for producing a cellulose nanofiber-containing polyolefin microporous stretched film, the cellulose nanofiber microporous composite film and the separator for nonaqueous secondary batteries according to the present invention can contribute toward realizing film products having improved puncture strength.

The invention claimed is:

1. A method for producing a cellulose nanofiber-containing polyolefin microporous stretched film, the method comprising: a first step of obtaining a cellulose powder dispersion mixture by uniformly dispersing a cellulose which has a powder particle shape and whose hydroxyl groups have been subjected to a lipophilizing treatment using a dibasic acid anhydride, in a plasticizer; a second step of melt-kneading the cellulose powder dispersion mixture and a polyolefin to obtain a polyolefin resin composition; a third step of extrusion-molding the polyolefin resin composition to obtain an extrudate; a fourth step of stretching the extrudate with a film stretcher to obtain a film; a fifth step of extracting out the plasticizer from the film; and a sixth step of thermally fixing the film from which the plasticizer has been extracted out for inhibiting contraction, while stretching the film at a temperature not higher than a melting point of the polyolefin, wherein a twin-screw kneading extruder is used only once throughout the second and third steps, and wherein the lipophilizing treatment comprises performing a monoesterification treatment.

2. The method for producing a cellulose nanofiber-containing polyolefin microporous stretched film according to claim 1, wherein the monoesterification is followed by performing a secondary propylene oxide addition treatment.

3. The method for producing a cellulose nanofiber-containing polyolefin microporous stretched film according to claim 1, wherein one kind or a mixture of several kinds among: liquid paraffin, nonane, decane, decalin, paraxylene, undecane and dodecane which are linear or cyclic aliphatic hydrocarbons; mineral oil fractions whose boiling point corresponds to that of liquid paraffin, nonane, decane, decalin, paraxylene, undecane and dodecane; and dibutyl phthalate and dioctyl phthalate which are phthalates having a liquid form at room temperature, is used as the plasticizer.

4. The method for producing a cellulose nanofiber-containing polyolefin microporous stretched film according to claim 1, wherein the cellulose powder is contained in an amount of from 0.01 to 30% by weight in the cellulose powder dispersion mixture.

5. A cellulose nanofiber microporous composite film comprising the cellulose nanofiber-containing polyolefin microporous stretched film produced by the production method according to claim 1, wherein the cellulose nanofiber microporous composite film comprises cellulose nanofibers dispersed and compounded in polyolefin, and wherein the cellulose nanofiber microporous composite film includes less aggregated cellulose than a comparative cellulose nanofiber microporous composite film which is prepared in the method according to claim 1 except for that the lipophilizing treatment is not performed.

6. The cellulose nanofiber microporous composite film according to claim 5, wherein an amount of cellulose in the polyolefin microporous stretched film is from 0.01 to 30% by weight based on a total weight of the polyolefin microporous stretched film.

7. A separator for nonaqueous secondary batteries, comprising the cellulose nanofiber-containing polyolefin microporous stretched film produced by the production method according to claim 1, wherein the separator comprises cellulose nanofibers dispersed and compounded in polyolefin.

* * * * *